(12) United States Patent
Park

(10) Patent No.: US 6,999,499 B1
(45) Date of Patent: Feb. 14, 2006

(54) DEMODULATION APPARATUS OF A BASE STATION IN A CDMA MOBILE COMMUNICATION SYSTEM

(75) Inventor: Won Hyoung Park, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/578,511

(22) Filed: May 26, 2000

(30) Foreign Application Priority Data

Jul. 6, 1999 (KR) ............................. 1999-27090

(51) Int. Cl.
*H04B 1/69* (2006.01)
*H04B 1/713* (2006.01)

(52) U.S. Cl. ............... 375/142; 375/143; 375/144; 375/145

(58) Field of Classification Search ........... 375/322, 375/316, 147, 150, 148, 149, 142, 143, 144, 375/145; 370/310, 320; 341/126, 155, 157
See application file for complete search history.

(56) References Cited

U.S. PATENT DOCUMENTS

| | | | | |
|---|---|---|---|---|
| 5,640,416 A | * | 6/1997 | Chalmers | ............... 375/147 |
| 5,990,820 A | * | 11/1999 | Tan | ............... 341/161 |
| 6,005,506 A | * | 12/1999 | Bazarjani et al. | ............ 341/143 |
| 6,026,117 A | * | 2/2000 | Ozluturk | ............... 375/141 |
| 6,198,417 B1 | * | 3/2001 | Paul | ............... 341/143 |
| 6,292,126 B1 | * | 9/2001 | Chelehmal et al. | ......... 341/155 |
| 6,307,879 B1 | * | 10/2001 | Moriyama | ............... 375/219 |
| 6,504,867 B1 | * | 1/2003 | Efstathiou | ............... 375/227 |

* cited by examiner

*Primary Examiner*—Jay K. Patel
*Assistant Examiner*—Qutub Ghulamali
(74) *Attorney, Agent, or Firm*—Fleshner & Kim, LLP

(57) ABSTRACT

A demodulation apparatus for a base station of a CDMA mobile communication system is provided, having an analog-to-digital converter device to convert an intermediate frequency signal into a digital signal and provide a quadrature component and an in-phase component of the digital signal, a plurality of filters to filter the components of the digital signal in the low pass band respectively, and a CDMA modem to demodulate the outputs of the plurality of filters. Since direct control by the digital signal of the base-band I channel and Q channel at the intermediate frequency can be performed and the analog-to-digital converter simultaneously performs the QPSK demodulation and the analog-to-digital conversion, the circuit design can be simplified and the characteristics reducing the noise can be obtained.

32 Claims, 2 Drawing Sheets

DEMODULATION APPARATUS OF A BASE STATION IN A CDMA MOBILE COMMUNICATION SYSTEM

BACKGROUND OF THE INVENTION

1. Field of the Invention

This invention relates to a base station in a Code Division Multiple Access (CDMA) mobile communication system, and more particularly, to a demodulation apparatus of a base station in CDMA mobile communication system.

2. Background of the Related Art

Quadrature Phase Shift Keying (QPSK) demodulation in a mobile communication system may be accomplished by converting a high frequency signal received via an antenna into an intermediate frequency signal by using a mixer, and dividing the intermediate signal into an In-Phase channel (channel) and a Quadra-Phase channel (Q channel) before demodulating to a base-band frequency signal with a demodulator. The analog base-band frequency signal thus demodulated into I and Q channels using the QPSK demodulation is then adjusted to a specific amplitude using a Low-Pass filter and an amplifier. Next, the signal is converted into a base-band digital signal, which is a CDMA signal, using an analog-to-digital converter. Finally, the CDMA signal is transferred to a CDMA modem for demodulation.

FIG. 1 shows a block diagram illustrating a related art base station receiver of a mobile communication system. Referring to FIG. 1, a signal transmitted from a mobile station is received through the base station antenna and relayed to a low noise amplifier 103 via the channel-pass filter 102. The low noise amplifier 103 then amplifies and outputs the signal, and passes it through the band-pass filter 104 and the high frequency amplifier 105. Next, the signal is converted into an intermediate frequency CDMA signal in the high frequency mixer 106.

The intermediate frequency CDMA signal then passes through a Surface Acoustic Wave (SAW) filter 107 and the intermediate frequency amplifier 108 to remove unnecessary signal components. The resulting signal is transmitted to the QPSK demodulator 109 where it is demodulated. The QPSK demodulator 109 outputs an I channel signal and a Q channel signal.

The high frequencies of the analog I channel and Q channel signals as demodulated by the QPSK demodulator 109 are removed by the low-pass filter 110. The filtered signals are then amplified by the base-band amplifier 111 to a specific amplitude compatible with the analog-to-digital conversion, and subsequently transferred to the Analog-to-Digital converter 112.

The Analog-to-Digital converter 112 converts the transmitted signal into a base-band digital signal. The base-band CDMA signal (i.e., the I channel and the Q channel converted to digital signals) is relayed to a CDMA modem 113 for demodulation. Thereafter, the demodulated CDMA signal is transferred to the central office 114, for example a switching station, as a Pulse Code Modulation (PCM) signal.

The QPSK demodulation method of the related art system, however, has various problems. For example, the signal is divided into the analog base-band frequency signal with an I channel and a Q channel by the QPSK demodulator 109, and the divided signal is converted to the digital signal using the Analog-to-Digital converter 112. As a result, numerous circuit devices are needed, making the circuit diagram is more complex, more expensive, and less efficient.

SUMMARY OF THE INVENTION

An object of the present invention is to provide a demodulation system that substantially obviates one or more of the problems caused by the disadvantages of the related art.

Another object of the present invention is to provide a demodulator that can perform Quadrature Phase Shift Keying (QPSK) modulation and Analog-to-Digital Conversion using only a Analog-to-Digital Converter.

Another object of the present invention is to provide an apparatus for base station demodulation of a CDMA mobile communication system that can directly perform the QPSK demodulation and Analog-to-Digital Conversion using only an Analog-to-Digital Converter of a QPSK receiver compatible with the mobile communication system.

Another object of the present invention is to provide a demodulation system for a base station in a mobile communication system which is power efficient and cost effective.

To achieve at least the above objects in whole or in part, there is provided an apparatus for the base station demodulation in a CDMA mobile communication system having an analog-to-digital converter device to convert an intermediate frequency signal into a digital signal and provide a quadrature component and an in-phase component of the digital signal, a plurality of filters to filter the components of the digital signal in the low pass band respectively, and a CDMA modem to demodulate the outputs of the plurality of filters.

To achieve the above objects in whole or in part, there is further provided a signal processing device having a digital sampling device to sample the transferred intermediate frequency signal, a signal arbiter to distinguish the amplitude of the intermediate frequency signal passed through the digital sampling device, and a quantization device to convert the distinguished intermediate frequency signal to a digital signal, a latch device to hold the converted digital signal for a specific period of time before transferring to a plurality of channels, and an output device to transfer the digital signal to each channel of a plurality of channels to a plurality of filters at the specific transfer periods.

To further achieve the above-described objects of the present invention in a whole or in parts, there is provided a signal processor that includes a digitizer, which receives and analog signal and generates a digital signal, a channel separator, which receives the digital signal from the digitizer and separates the digital signal into at least 2 channels, each channel having a different phase, and a phase shift controller, which receives a clock signal and controls the phase shifting of the channel separator.

To further achieve the above-described objects of the present invention in a whole or in parts, there is provided a demodulator for a CDMA receiver that includes an input circuit to amplify a filtered CDMA formatted input signal, a first signal processor to generate an intermediate frequency CDMA signal based on the amplified input signal, a second signal processor to output first and second digital signals on first and second channels, respectively, based on the intermediated frequency CDMA signal, the second signal processor having an analog-to-digital converter to convert the intermediate frequency CDMA signal to an intermediate digital signal and a channel separator to generate the first and second digital signals based on the intermediate digital signal, and an output circuit to output a demodulated output signal based on the first and second digital signals, the output circuit having first and second Finite Impulse Response SIR) filters to receive and filter the first and second digital signals, respectively, wherein the first and second digital signals have different phases.

Additional advantages, objects, and features of the invention will be set forth in part in the description which follows and in part will become apparent to those having ordinary skill in the art upon examination of the following or may be learned from practice of the invention. The objects and advantages of the invention my be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
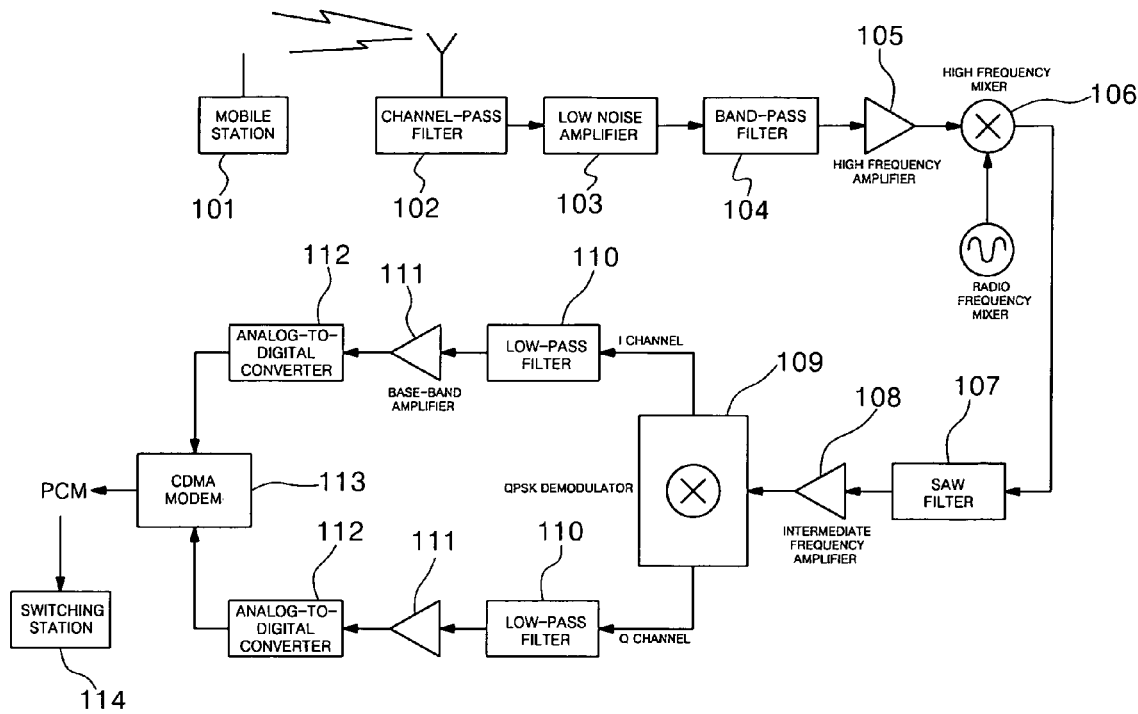
FIG. 1 is a block diagram of a related art mobile communication system.
Figure 2:
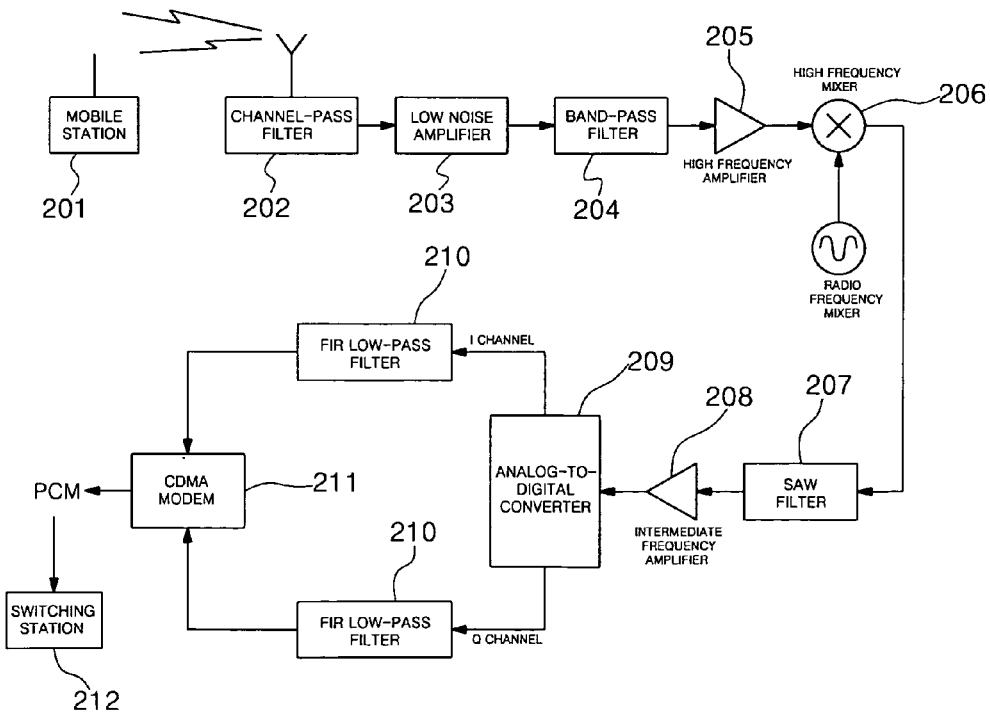
FIG. 2 is a block diagram showing a CDMA mobile communication system with a base station demodulation apparatus in accordance with a preferred embodiment of the present invention.

FIG. 2 illustrates the base station demodulation apparatus for a CDMA mobile communication system according to a preferred embodiment of the present invention. Elements 201 through 208 are similar to the related art base station receiver of the mobile communication system of FIG. 1. The system as shown in FIG. 2, however, uses an Analog-to-Digital converter 209 as a signal processing device to perform both QPSK demodulation and Analog-to-Digital conversion.

Figure 3:
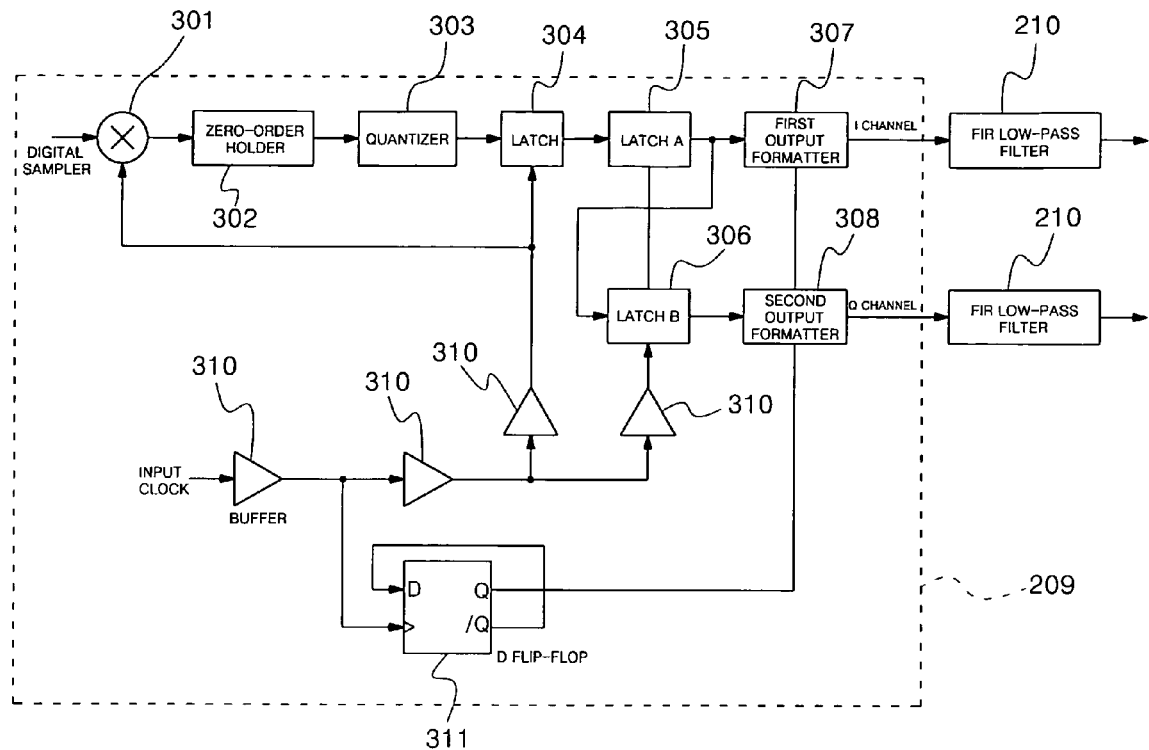
FIG. 3 is a block diagram showing the Analog-to-Digital converter of FIG. 2.

As illustrated in FIG. 3, the Analog-to-Digital converter 209 of the signal-processing device preferably includes a digital sampler 301 to sample the intermediate frequency signal received from the intermediate frequency amplifier 208, and a zero-order holder 302, which serves as a signal arbiter for distinguishing the amplitude of the intermediate frequency signal sampled by the digital sampler 301. A quantizer 303 then converts the distinguished intermediate frequency signal to a digital signal.

First, second, and third latch devices 304, 305 and 306 delay the converted digital signal for a prescribed time period before transferring it to a plurality of channels, for example, an I channel and Q channel, by way of first and second formatters 307 and 308. The first and second formatters 307 and 308 in turn periodically transmit the channel divided digital signals to a corresponding plurality of filters 210. The filters are preferably low pass filters, for example, a Finite Impulse Response (FIR) low pass filter. The system further includes a plurality of buffers 310 for buffering the transferred signal, and a D flip-flop 311.

Figure 4:
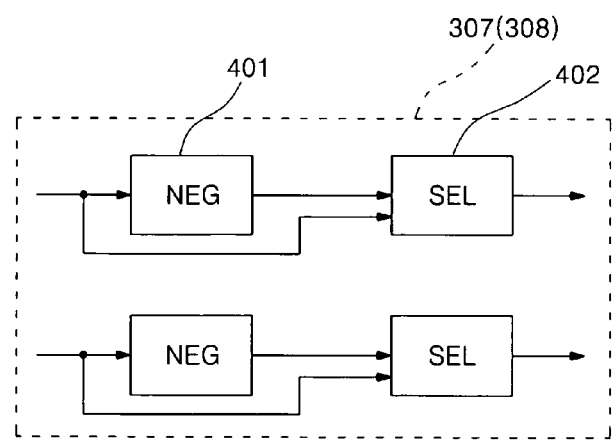
FIG. 4 is a block diagram showing the internal circuit of the output formatter of FIG. 3.

Referring to FIG. 4, the first and second formatters 307 and 308 are preferably provided with a plurality of negators 401 for negating the transferred signal and outputting the signal, and a plurality of selectors 402 of selecting one of the output signals of the negator 401 and the signal that has not passed through the negator 401.

The demodulation process of the base station signal will now be described. Referring to FIGS. 2 and 3, the CDMA analog signal transferred to the Analog-to-Digital converter 209 from the intermediate frequency amplifier 208 is sampled by the digital sampler 301. At this time, the prescribed sampling frequency is preferably twice the frequency of the sampling clock of the desired base-band frequency subtracted from the transferred intermediate frequency. The selected clock frequency, however, is established so as to avoid Aliasing and the clock selected for the bandwidth of the base-band signal should be over the Nyquist rate.

"Aliasing" must be considered when the sampling signal is recovered. Aliasing occurs when the original signal cannot be distinguished or properly reconstructed due to an overlap of the recovered signal. When aliasing occurs, the original signal takes on the identity of a lower frequency, and information can be lost. That is, when the sampling frequency is lower than twice the signal bandwidth of the signal that is being repeatedly generated at the sampling period rate in a Fourier domain, the original signal begins to overlap itself. The original signal thus cannot be reconstructed even if a filter is used. Therefore, after the analog signal is converted to the digital signal, the digital signal can only be transformed back to the original signal using a sampling frequency over the Nyquist rate.

In order to convert the continuous analog input signal that has been passed through the above-described sampling process into the digital signal, a zero-order-hold circuit 302 is used, which distinguishes the amplitude of the signal, preferably at discrete time points. The sampling signal, which is preferably in the form of a discrete time signal, is a continuous signal component repeatedly inputted at a prescribed frequency, generates the digital signal of the proper value according to the amplitude of the input signal.

At the same time, the under-sampling process occurs as the transferred clock frequency is inputted to the buffer 310. The under-sampling process is a process which applies the analog demodulation process to the digital demodulation process and intentionally aliases the signal. Generally, when the signal demodulated with the high frequency is converted by Analog-to-Digital conversion, it is sampled with the clock having a frequency of more than twice the corresponding frequency (the Nyquist Rate) to generate the digital signal. However, in the case of the under-sampling process, demodulation of the under frequency is accomplished at the same time as the Analog-to-Digital conversion takes place by using the Analog-to-Digital clock (which has a frequency of more than twice the bandwidth of the demodulated signal) with the frequency lower than that of the modulated signal.

The under-sampling process occurs when the analog demodulation process is applied to the digital demodulation process. In general, when the signal modulated to the high frequency is converted from analog to digital, the clock having more than twice the subject frequency is used for the sampling to digitize the signal. In the case of the under-sampling, the clock with more than twice the frequency of the bandwidth of the signal demodulated to the lower frequency than the modulated signal is used as the analog-to-digital clock, and the under demodulation of the frequency is performed at the same time as the analog-to-digital conversion takes place. The output frequency of the quantizer 303 is repeatedly performed throughout all band areas in the sampling frequency periods during the sampling process. Therefore, among the output frequency of the quantizer 303, only the output frequency of the base-band quantizer is allowed to pass through the low-pass filter 210 to perform the demodulation process.

The clock inputted to the buffer 310 is supplied to the first and second output formatters 307 and 308 after the D flip-flop 311 performs a binary counting procedure. The output of the latch B 306, which is shifted one clock period from the output of latch A 305, is latched again to 0.5 times the frequency of the quantization output frequency. As a result, a QPSK demodulation signal shifted 90° out of phase with twice the periodic occurrences of the transmitted clock can be obtained.

The CDMA digital signal converted by the analog-to-digital converter is latched by the latch 304 at more than twice the sampling periods transferred to the I channel and Q channel, before being transmitted to the latch A 305. The latch A 305 then transfers the I channel signal of the transferred base-band digital CDMA signal to a Finite Impulse Response (FIR) low-pass filter 210 at the desired base-band transferred periods via the first output formatter 307.

The Q channel is inputted to the latch B 306, and as the same latched signal having a delay of one sample period with a phase difference of 90° to the I channel having twice the sampling period is transferred to the second output formatter 307, the same function as the analog QPSK is accomplished.

That is, in the low-pass FIR filter 210, the unnecessarily repeated signal components generated during the "under-sampling process" and "Analog-to-Digital. Conversion process" are removed before the base-band digital CDMA signal is transmitted to the switching station 212 through the PCM signal via the CDMA modem 211.

As described above, the base station demodulation apparatus of a CDMA mobile communication system in accordance with a preferred embodiment of the present invention has several advantages. For example, the digital signal of I channel and Q channel of the base-band can be directly demodulated in the intermediate frequency.

Additionally, since the Analog-to-Digital converter 209 is constructed to simultaneously perform the QPSK demodulation and Analog-to-Digital conversion, the number of circuit devices can be reduced and the circuit design can be simplified, resulting in a reduction of the power consumption, manufacturing costs, as well as overall size.

Moreover, since the digital FIR low-pass filter is used, phase linearity of the signal and noise reduction characteristics can be obtained.

Also, by using a Field Programmable Gate Array (FPGA), the alteration of the clock that is being used and the specific coefficients of the FIR low-pass filter can easily be reorganized, thereby the embodiment of the present invention can be applied to the various communication systems that use QPSK.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A demodulation apparatus for a communication system, comprising:
   an analog-to-digital converter device to convert an intermediate frequency signal into a digital signal and provide a quadrature component and an in-phase component of the digital signal;
   a plurality of filters to filter components of the digital signal outputted from the analog-to-digital converter device in a low pass band respectively; and
   a CDMA modem to demodulate outputs of the plurality of filters,
   wherein the analog-to-digital converter device includes:
      a quantizer to convert the intermediate frequency signal into the digital signal;
      a latch circuit to receive the digital signal and output first and second signals in which the second signal is a delayed first signal; and
      an output formatter to receive the first and second signals and output the first and second signals at prescribed periods to produce the quadature component and the in-phase component of the digital signal.

2. The apparatus of claim 1, wherein said analog-to-digital converter further comprises:
   a digital sampler to sample the intermediate frequency signal; and
   a zero-order hold device to determine an amplitude of the sampled intermediate frequency signal,
   wherein the latch circuit includes a plurality of latches to transmit the digital signal from the quantizer to a plurality of channels after a prescribed time delay, and
   wherein the output formatter includes a plurality of output formatters to periodically output the latched digital signal transmitted to corresponding channels of the plurality of channels.

3. The apparatus of claim 2, wherein each of said plurality of output formatters comprises:
   a plurality of negators to negate the latched digital signal and output a negated latched signal; and
   a plurality of selectors one to one coupled to each of the plurality of negators to select and output one of the negated latched signal and an unprocessed latched digital signal.

4. The apparatus of claim 3, wherein the plurality of output formatters comprise first and second output formatters, and wherein the output of each output formatter is received by a low pass filter.

5. The apparatus of claim 2, wherein the plurality of channels comprise an In-phase channel and a Quadrature channel.

6. An analog-to-digital converter, comprising:
   a digital sampler to sample an intermediate frequency signal;
   a zero-order holder to determine an amplitude of the sampled intermediate frequency signal;
   a quantizer to convert the sampled intermediate frequency signal processed by the zero-order holder to a digital signal;
   a plurality of latches to transmit the digital signal to a plurality of channels after a prescribed time delay; and
   a plurality of output formatters to periodically output the latched digital signal transmitted to corresponding channels of the plurality of channels,
   wherein each of said plurality of output formatters comprises:
      a plurality of negators to negate the latched digital signal and output a negated latched signal; and
      a plurality of selectors to select and output one of the negated latched signal and an unprocessed latched digital signal.

7. The apparatus of claim 6, wherein the plurality of output formatters comprise a first and second output formatter, and wherein the output of each output formatter is received by a low pass filter.

8. The apparatus of claim 6, wherein the plurality of channels comprise an I channel and a Q channel.

9. A signal processor, comprising:
a digitizer, which receives an analog signal and generates a digital signal, wherein the digitizer comprises:
a sampler, which receives and samples the analog signal,
a zero order hold circuit, which receives an output of the sampler and determines an amplitude of the received signal, and
a quantizer, which receives an output of the zero order hold circuit and generates the digital signal,
a channel separator, which receives the digital signal from the digitizer and separates the digital signal into at least 2 channels, each channel having a different phase; and
a phase shift controller, which receives a clock signal and controls the phase shifting of the channel separator,
wherein the channel separator comprises:
a latch circuit, which receives the digital signal and outputs a first signal and a second signal, wherein the second signal is a delayed first signal; and
an output formatter, which receives the first and second signals and outputs the first and second signals at prescribed periods, and
wherein the latch circuit comprises a first latch, a second latch, and a third latch, wherein the output formatter comprises a first output formatter and a second output formatter, and wherein the first latch receives the digital signal from the digitizer, the second latch receives the output of the first latch and provides the first signal to the first output formatter and the third latch, and the third latch provides the second signal to the second output formatter.

10. The signal processor of claim 9, wherein the channels comprise a Q channel and an I channel having a phase difference of approximately 90°.

11. The signal processor of claim 9, wherein the analog signal is an intermediate frequency CDMA formatted signal.

12. The signal processor of claim 11, wherein an output of the signal processor is a QPSK modulated digital signal, having a first component and a second component out of phase with the first component.

13. The signal processor of claim 9, wherein the phase shift controller provides the clock signal to the first, second, and third latches to control the phase shifting, and provides a control signal to the first and second output formatters to control output periods.

14. The signal processor of claim 9 wherein the first and second output formatters each comprise:
a plurality of negators, which receive and negate the corresponding first or second signal; and
a plurality of selectors to select and output one of the negated signal from the negator and the corresponding first or second signal, wherein each one of the plurality of negators is coupled to one of the plurality of selectors.

15. The signal processor of claim 9, wherein the phase shift controller comprises:
a plurality of buffers to receive and forward the clock signal; and
a logic circuit responsive to a buffered clock signal to generate a control signal to control an output of the channel separator.

16. The signal processor of claim 9, further comprising a plurality of Finite Impulse Response (FIR) filters coupled to receive an output of the channel separator, wherein an individual FIR filter is coupled to each channel of the at least two channels.

17. A demodulator for a CDMA receiver, comprising:
an input circuit to amplify a filtered CDMA formatted input signal;
a first signal processor to generate an intermediate frequency CDMA signal based on the amplified input signal; a second signal processor to output first and second digital signals on first and second channels, respectively, based on the intermediated frequency CDMA signal, said second signal processor having an analog-to-digital converter to convert the intermediate frequency CDMA signal to an intermediate digital signal and a channel separator to generate the first and second digital signals based on the intermediate digital signal; and
an output circuit to output a demodulated output signal based on the first and second digital signals, said output circuit having first and second Finite Impulse Response (FIR) filters to receive and filter the first and second digital signals, respectively, wherein the first and second digital signals have different phases,
wherein the analog-to-digital converter device includes:
a quantizer to convert the intermediate frequency signal into the digital signal;
a latch circuit to receive the digital signal and output first and second signals in which the second signal is a delayed first signal; and
an output formatter to receive the first and second signals and output the first and second signals at prescribed periods to produce the quadature component and the in-phase component of the digital signal.

18. A method comprising:
converting an analog signal to a digital signal in an analog-to-digital converter;
separating components of the digital signal from the digital signal in the analog-to-digital converter; and
sampling the analog signal at a frequency that is four times the frequency of each component of the digital signal,
wherein separating the components of the digital signal uses at least one from at least one buffer; at least one latch; at least one flip-flop; or at least one formatter,
wherein separating the components of the digital signal from the digital signal comprises:
outputting on a first channel bits of the digital signal that are associated with the in-phase component of the digital signal, and
outputting on a second channel bits of the digital signal that are associated with the quadrature component of the digital signal, and
wherein:
each bit of said bits of the digital signal that are associated with the in-phase component of the digital signal is separated by three consecutive bits that are not associated with the in-phase component of the digital signal;
each bit of said bits of the digital signal that are associated with the quadrature component of the digital signal is separated by three consecutive bits that are not associated with the quadrature component of the digital signal; and each bit of said bits of the digital signal that are associated with the in-phase component of the digital signal are adjacent a bit of said of the digital signal that is associated with the quadrature component of the digital signal.

19. The method of claim 18, wherein the components of the digital signal are:
an in-phase component of the digital signal; and
a quadrature component of the digital signal.

20. The method of claim 19, wherein:
an in-phase component of the digital signal is associated with an in-phase component of the analog signal;
the quadrature component of the digital signal is associated with the quadrature component of the analog signal; and
the quadrature component of the analog signal is 90 degrees out of phase with the in-phase component of the analog signal.

21. The method of claim 18, wherein the analog signal embodies a CDMA communication signal.

22. The method of claim 18, wherein the converting the analog signal to the digital signal comprises:
sampling the analog signal to produce a sampled analog signal; and
quantizing the sampled analog signal to produce the digital signal.

23. The method of claim 22, wherein sampling the analog signal comprises sampling at a frequency that is four times the frequency of each component of the digital signal.

24. The method of claim 23, wherein the separating components of the digital signal from the digital signal comprises:
outputting on a first channel bits of the digital signal that are associated with the in-phase component of the digital signal; and
outputting on a second channel bits of the digital signal that are associated with the quadrature component of the digital signal.

25. The method of claim 18, wherein each bit of said bits of the digital signal that are associated with the in-phase component of the digital signal are preceding a bit of said of the digital signal that is associated with the quadrature component of the digital signal.

26. An apparatus configured to:
convert an analog signal to a digital signal in an analog-to-digital converter; and
separate components of the digital signal from the digital signal in the analog-to-digital converter,
wherein for separating the components of the digital signal, the apparatus comprises at least one from at least one buffer; at least one latch; at least one flip-flop; or at least one formatter,
wherein to sample the analog signal comprises sampling at a frequency that is four times the frequency of each component of the digital signal,
wherein to separate components of the digital signal from the digital signal comprises:
outputting on a first channel bits of the digital signal that are associated with the in-phase component of the digital signal; and
outputting on a second channel bits of the digital signal that are associated with the quadrature component of the digital signal, and wherein:
each bit of said bits of the digital signal that are associated with the in-phase component of the digital signal is separated by three consecutive bits that are not associated with the in-phase component of the digital signal:
each bit of said bits of the digital signal that are associated with the quadrature component of the digital signal is separated by three consecutive bits that are not associated with the quadrature component of the digital signal; and
each bit of said bits of the digital signal that are associated with the in-phase component of the digital signal are adjacent a bit of said of the digital signal that is associated with the quadrature component of the digital signal.

27. The apparatus of claim 26, wherein the components of the digital signal are:
an in-phase component of the digital signal; and
a quadrature component of the digital signal.

28. The apparatus of claim 23, wherein the analog signal embodies a CDMA communication signal.

29. The apparatus of claim 26, wherein:
an in-phase component of the digital signal is associated with an in-phase component of the analog signal;
the quadrature component of the digital signal is associated with the quadrature component of the analog signal; and
the quadrature component of the analog signal is 90 degrees out of phase with the in-phase component of the analog signal.

30. The apparatus of claim 26, wherein to convert the analog signal to the digital signal comprises:
sampling the analog signal to produce a sampled analog signal; and
quantizing the sampled analog signal to produce the digital signal.

31. The apparatus of claim 26, wherein each bit of said bits of the digital signal that are associated with the in-phase component of the digital signal are preceding a bit of said of the digital signal that is associated with the quadrature component of the digital signal.

32. An apparatus comprising:
an analog-to-digital converter;
a means for converting an analog signal to a digital signal in the analog-to-digital converter; and
a means for separating components of the digital signal from the digital signal in the analog-to-digital converter,
wherein the analog-to-digital converter device includes:
quantizer means for converting the intermediate frequency signal into the digital signal;
latch means for receiving the digital signal and output first and second signals in which the second signal is a delayed first signal; and
output formatter means for receiving the first and second signals and outputting the first and second signals at prescribed periods to produce the separating components, which correspond to a quadature component and an in-phase component of the digital signal.

* * * * *